United States Patent [19]
Grice

[11] Patent Number: 4,997,143
[45] Date of Patent: Mar. 5, 1991

[54] SPIN CASTING REEL WITH TOOLLESSLY REMOVABLE SPOOL AND SPOOL CAP

[75] Inventor: Steven L. Grice, Spirit Lake, Iowa
[73] Assignee: Berkley, Inc., Spirit Lake, Iowa
[21] Appl. No.: 402,876
[22] Filed: Sep. 5, 1989
[51] Int. Cl.[5] ............................................ A01K 89/01
[52] U.S. Cl. .................................... 242/311; 242/234; 242/312
[58] Field of Search ............... 242/311, 312, 234, 235, 242/236, 237, 238, 239, 240

[56] References Cited

U.S. PATENT DOCUMENTS

| | | |
|---|---|---|
| 2,974,895 | 3/1961 | Wood . |
| 3,057,575 | 10/1962 | Hull ..................................... 242/311 |
| 3,152,771 | 10/1964 | Maury et al. ....................... 242/311 |
| 3,223,346 | 12/1965 | Fowler ................................ 242/311 |
| 3,520,488 | 7/1970 | Vouthier . |
| 3,635,418 | 1/1972 | Kamei . |
| 3,788,570 | 1/1974 | Yamazaki et al. .................. 242/311 |
| 3,946,963 | 3/1976 | Oberg . |
| 4,238,085 | 12/1980 | Jansson et al. . |
| 4,770,363 | 9/1988 | Tsunoda et al. . |
| 4,811,916 | 3/1989 | Yeh .................................... 242/311 |

Primary Examiner—Katherine Matecki
Attorney, Agent, or Firm—Faegre & Benson

[57] ABSTRACT

A spin casting fishing reel is provided with a key slideably mounted within the frame for providing release of the spindle shaft assembly from the reel frame. The key is slideable from a first key position, which operatively retains the shaft assembly within the frame, to a second key position, which releases the shaft assembly, so that the entire spindle shaft assembly can be removed from the frame. Once released from the frame, the entire spindle shaft assembly can be easily disassembled into its component parts for repair or readjustment. With the spin casting fishing reel reassembled to its normal operating position, it operates as any conventional spin casting fishing reel.

6 Claims, 4 Drawing Sheets

SPIN CASTING REEL WITH TOOLLESSLY REMOVABLE SPOOL AND SPOOL CAP

BACKGROUND OF THE INVENTION

This invention relates to a spin casting fishing reel provided with means for easily releasing the spindle shaft assembly including the spool and spool cap from the fishing reel frame without requiring the use of tools. More particularly, the means for releasing the spindle shaft assembly from the frame is a key slideably mounted within the frame, such that the key can be readily slid by finger pressure alone from a first key position, which operatively retains the spindle shaft assembly within the frame, to a second key position, which releases the spindle shaft assembly, so that the entire spindle shaft assembly can be removed from the frame.

Typically, conventional spin casting reels have a main axle or shaft which is rotatably mounted within the frame. The shaft assembly includes a shaft with a spool cap mounted for rotation with the spindle shaft and a line spool with a boss on the frame for rotation as a drag means. A pinion gear on the shaft itself engages a rotating drive gear mounted on the frame. Rotation of the main drive gear by a crank handle rotates the spindle shaft and spool cap assembly to retrieve line on to the line spool. On the conventional spin cast fishing reel, the shaft and spool cap assembly and spool are mated with the frame so that tools must be used to remove the spool.

Tangling and snarling of fishing line during casting, paying out or reeling in line is a common occurrence with typical spin cast reels. With a conventional spin cast reel as just described, the spool and spool cap cannot be removed without tools. Thus, untangling, spool changing and rewinding line often becomes a tedious and frustrating interruption for the fisherman, particularly if he has a tendency to lose small parts.

With the spin casting fishing reel according to the present invention, a simple key mechanism within the body of the frame is slideable to either of two positions without using tools. The first key position retains the shaft with the line spool operatively engaged with the frame. The second key position releases the spindle shaft assembly from operative engagement with the frame, so that the spindle shaft assembly and spool can be withdrawn from the frame. Such ready access to the interior of the reel, especially to the spool, allows the fisherman to readily replace the spool and easily untangle or adjust the line for further fishing.

SUMMARY OF THE INVENTION

Thus, this invention provides a spin casting fishing reel with a removable spindle shaft assembly to provide ready access to the line spool. The spin casting reel frame has an axial shaft hole, a main drive gear supported by the frame, and a keyway extending radially from the frame exterior to the shaft hole. The spindle shaft assembly is axially mountable through the shaft hole and includes a shaft with a spool cap mounted for rotation with the shaft, a spindle shaft sleeve mounted on the frame, a line spool axially mountable for rotation around the spindle shaft sleeve as a drag means, a pinion gear on the shaft and a compression spring that retains the pinion gear.

A key is slideably track mounted within the keyway, and is radially slideable from a first to a second key position. The first key position is radially inward toward the shaft hole, so that the key retains the spindle shaft assembly to position the pinion gear in operative engagement with the main rotation drive gear. In this first key position, the spindle shaft assembly is thus in operative position within the reel frame. The second key position is radially outward from the shaft hole, such that the pinion gear operatively disengages from the drive gear means. In this second key position, the spindle shaft assembly can be withdrawn axially from the shaft hole. When the spindle shaft assembly is withdrawn from the frame, the line spool can then be easily removed from the spindle shaft sleeve. To further provide access to all parts of the fishing reel mechanism, the spindle shaft sleeve is removably mounted on the shaft. Thus, when the spindle shaft assembly is withdrawn axially from the shaft hole, and the line spool is withdrawn axially from the spindle shaft sleeve, the spindle shaft sleeve can be withdrawn axially from the shaft by removing a compression spring and the pinion gear.

DETAILED DESCRIPTION OF THE INVENTION

Figure 1:
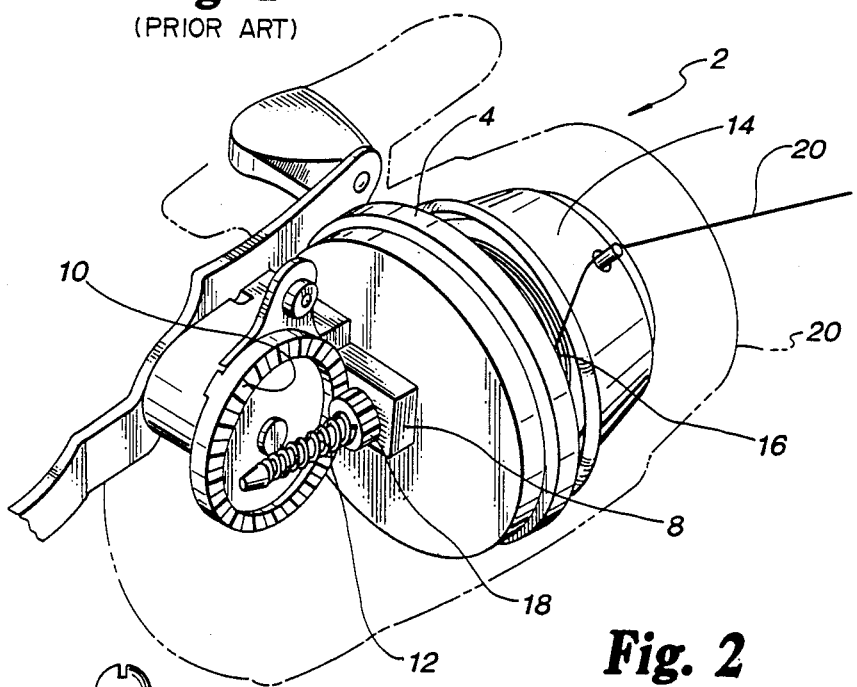
FIG. 1 is a perspective view of a typical conventional spin casting fishing reel showing the mechanical subassembly with the cover shown in phantom line.
Figure 2:
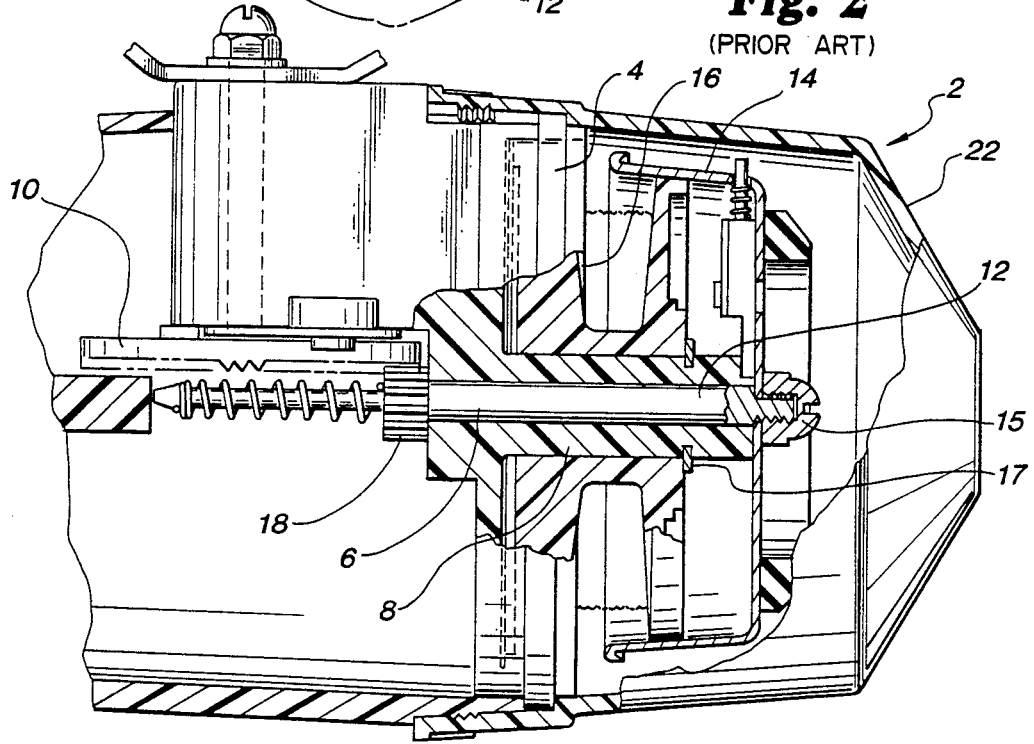
FIG. 2 is a fragmentary right side elevational view of the conventional reel of FIG. 1 with parts cut away.

In a typical conventional spin casting fishing reel 2, as shown in FIGS. 1 and 2, the shaft assembly is retained within the reel frame 4. Thus, the reel frame 4 has an axial shaft hole 6 within bearing block 8 and a main rotation drive gear 10. The spindle shaft assembly is axially mounted for rotation about shaft receiving hole 6 in bearing block 8. The spindle shaft assembly in this conventional reel 2 includes a shaft 12 or main axle with a spool cap 14 mounted for rotation with the shaft 12, a line spool 16 mounted for rotation around the shaft 12, pinion gear 18 biased by compression spring 17 mounted axially on the shaft 12 for rotation by the drive gear 10. Should access to the interior of the reel 2 be needed, as when the line 20 become tangled, this can only be accomplished by removal of the housing cover 22 and using suitable tools to unscrew the nut 15 which retains spool cap 14 and then using other appropriate tools to remove the clevis 17 which secures the spool.

In the spin casting fishing reel 24 of the present invention, as shown in FIGS. 3 through 8, the spindle shaft assembly is readily removable from the reel frame 26 without tools and the individual parts of the spindle shaft assembly are separable. Thus, the reel frame 26 has an axial shaft receiving hole 28, a drive gear 30 which is rotatably supported by frame 26 and a keyway 32 extending radially from the frame exterior to the shaft 34. The spindle shaft assembly includes a spindle shaft 34 with a spool cap 36, a spindle shaft sleeve 38, a line spool 40, a pinion gear 42, and a compression spring 46, all of which are axially mounted on the shaft 34.

Figure 8:
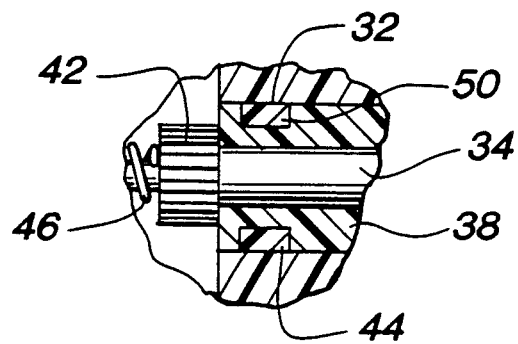
FIG. 8 is a sectional view taken along line 8—8 of FIG. 3.
Figure 9:
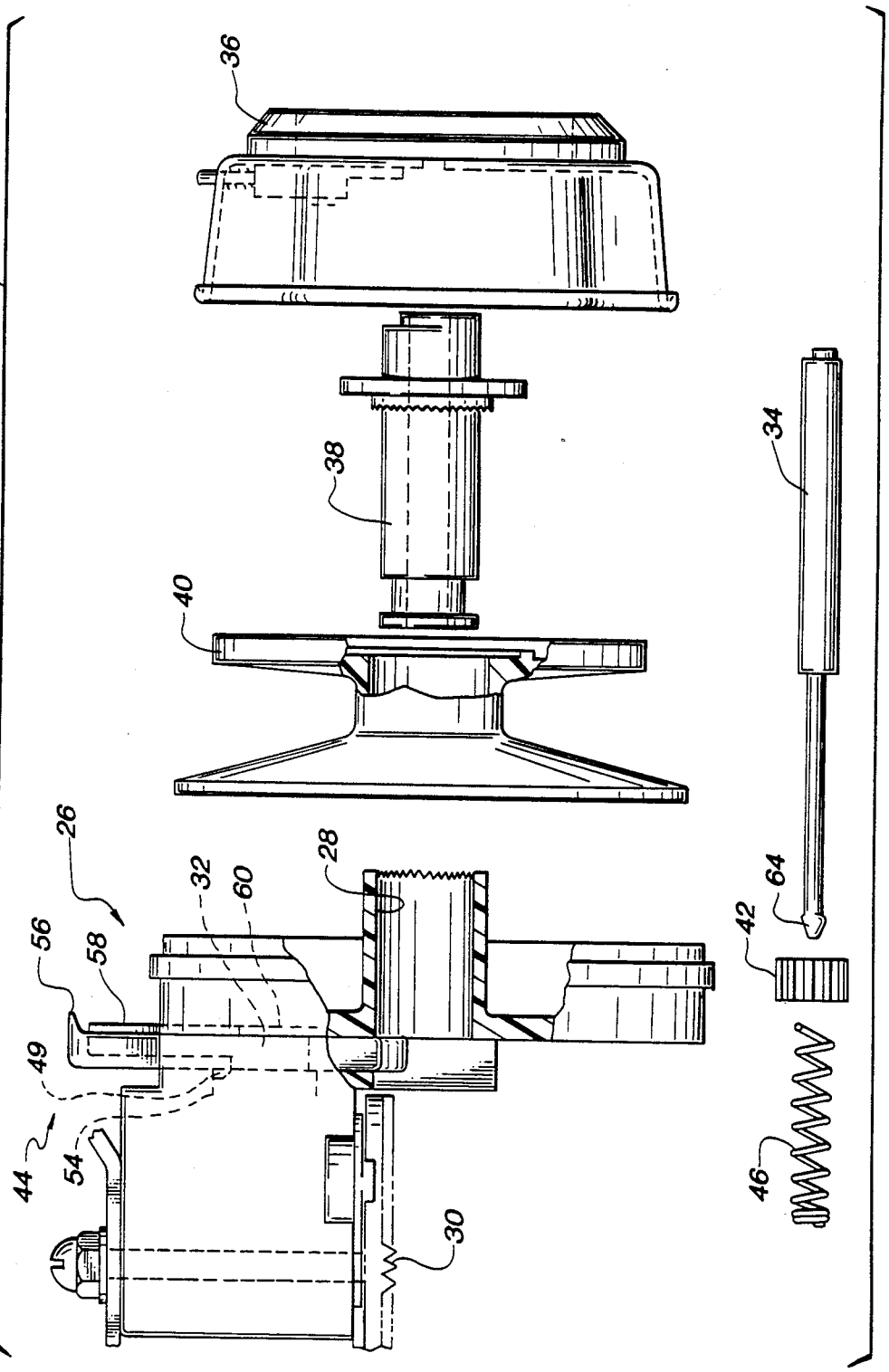
FIG. 9 is an exploded perspective of the reel frame and spindle shaft assembly with parts separated.

A key 44 is slideably mounted within the keyway 32 and is radially slideable from a first to a second key position. The reel 24 of the present invention with the key 44 in the first key position is illustrated in FIGS. 3, 4 and 6 through 8. The first key position has the key 44 at the radially inward position in the keyway such that the key 44 engages and retains the spindle shaft sleeve 38 to maintain pinion gear 42 in operative engagement with drive gear 30. The second key position, as illustrated in FIG. 9, has the key 44 in a position extended radially outward from the axis of shaft 34 to allow the spindle shaft assembly to be withdrawn axially from the frame 26. When the spindle shaft assembly is removed, spool 40 can be withdrawn axially from the shaft sleeve 38 and snagged line can be replaced on spool 40 or the spool may be easily changed.

Figure 3:
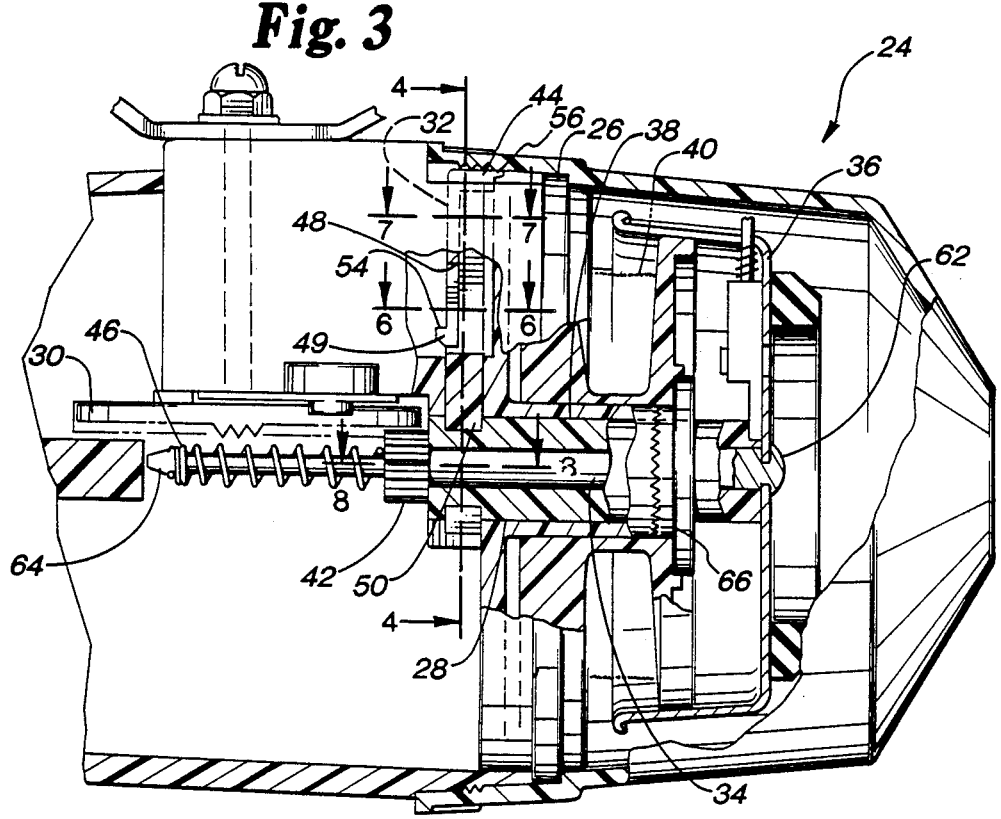
FIG. 3 is a view similar to that of FIG. 2 showing the spin casting fishing reel according to the present invention.
Figure 4:
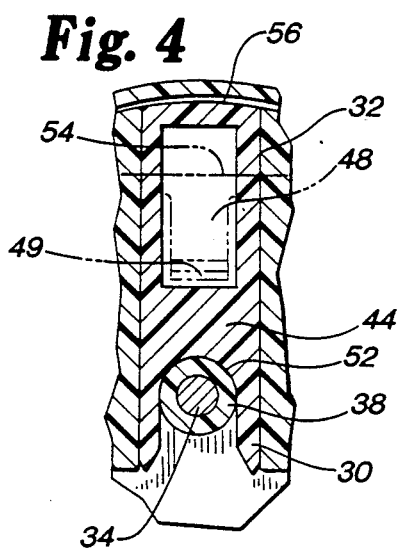
FIG. 4 is a sectional view taken along line 4—4 of FIG. 3.
Figure 5:
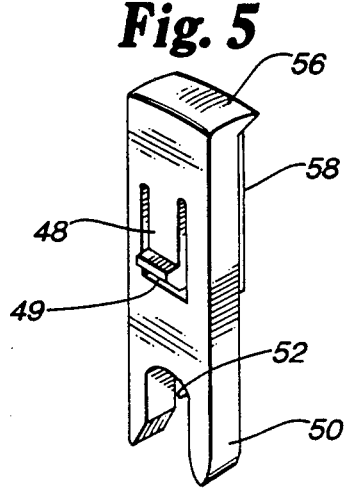
FIG. 5 is a detailed isometric view of the key.
Figure 6:
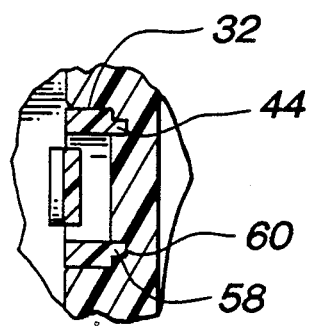
FIG. 6 is a sectional view taken along line 6—6 of FIG. 3.
Figure 7:
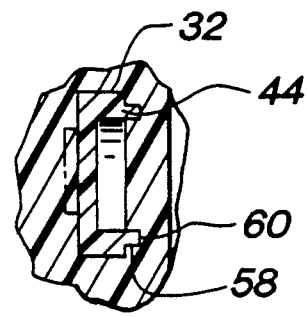
FIG. 7 is a sectional view taken along line 7—7 of FIG. 3.

Key 44 which allows for toolless release of spool 40, is better illustrated in FIGS. 4 and 5. The distal portion of the key 44, where it engages spindle shaft sleeve 38 in the first key position (as illustrated in FIGS. 3, 4 and 8), is provided with a clevis 50 having an appropriate hub retaining radius 52 for closely engaging spindle shaft sleeve 38. The body of the key 44 has a three sided cutout to form a spring 48 with a detent latch 49. When key 44 is radially slid to the second key position, detent latch 49 engages stop 54 within keyway 32 to prevent key 44 from being entirely removed from the keyway 32. To assist in sliding key 44 from the first to the second keyway position without using tools, the key 44 is formed with a pulling ledge or lip 56 and the keyway 32 is sized to provide minimum effective access for a finger tip to engage pulling ledge 56 to retract the key 44 radially outwardly from the first to the second key positions. To allow the key 44 to slide smoothly between the two key positions, the key 44 is provided with tracks 58 to slide within interlocking track grooves 60 within the keyway 32. The key 44, the keyway 32 and the frame 26 are all sized relative to each other such that, when the key 44 is in the first key position, the key exterior is flush with the frame exterior.

In order to assemble the spin casting reel 24 according to the present invention into normal operating position, key 44 is slid to the second key position. Spool cap 36 is mounted for rotation with shaft 34, as by a rivet or staking process. Spindle shaft sleeve 38 is slid onto the spindle shaft 34 to abut the spool cap 36, the pinion gear 42 is slid onto the spindle shaft 34 to abut the spindle shaft sleeve 38. Compression spring 46 is slid onto spindle shaft 34 to abut the pinion gear 42 and is frictionally engaged on the shaft by slight enlargement at the tip end 64 of the spindle shaft 34. Note that pinion gear 42 has a non-circular opening which mates with the non-circular profile of the spindle shaft 34 to ensure rotation of the pinion gear 42 and the spindle shaft 34 as a unit. Line spool 40 is slid onto spindle shaft sleeve 38 passing over the compression spring 46 and the pinion gear 42 to abut the spool hub interface 66. The assembled spindle shaft assembly can be axially positioned to engage drive gear 30 on the frame 26. The key 44 is then slid to the first key position to capture and retain the spindle shaft sleeve 38 so that the pinion gear 42 is maintained in operative engagement with the drive gear 30. With the spindle shaft assembly held in position with key 44 in the first key position, the operation of the spin casting fishing reel of this invention is identical to that of other conventional spin casting fishing reels.

In order to release the spindle shaft assembly from the frame 26, the users finger can be inserted into the keyway 32 to engage the key pulling ledge 56 and slide key 44 from the first to the second key position. The entire spindle shaft assembly and particularly the spool 40 can then be axially withdrawn from frame 26 to permit untangling, spool changing and rewinding line onto spool 40.

What is claimed is:

1. A spin casting fishing reel with a spool which is removable without using tools, the reel comprising in combination:

a spin casting fishing reel frame with an axial shaft receiving hole, a main rotation drive gear supported by the frame, and a keyway extending radially from the frame exterior to the shaft axis;

a spindle shaft assembly mountable on the frame in axial alignment with the shaft axis, the spindle shaft assembly including a spindle shaft with a spool cap mounted for rotation with the shaft, a spindle shaft sleeve mountable on the spindle shaft in axial alignment with the shaft axis, a line spool mountable on the spindle shaft sleeve in axial alignment with the shaft axis, and a pinion gear mounted on the spindle shaft in axial alignment with the shaft axis and retained by a compression spring;

a retaining key slideably mounted within the keyway, radially slideable from a first to a second key position;

the first key position having said key positioned radially inwardly toward the shaft axis, the key provided with means for engaging the spindle shaft, such that the key engages the spindle shaft sleeve thereby maintaining the spindle shaft assembly axially fixed relative to the frame and maintaining the pinion gear in operative engagement with the drive gear; and the second key position having said key positioned radially outwardly from the shaft axis, allowing the spindle shaft assembly to be moved thereby allowing spool removal.

2. A spin casting fishing reel according to claim 1, wherein a housing cover is threadably engageable with a cooperative threaded portion of the reel frame and wherein the keyway projects through the threaded portion of the reel frame, the kay being sized so that it is fully enclosed within the reel frame when in the first key position and is retained in that position by the housing cover when the housing cover is engaged with the reel frame.

3. A spin casting fishing reel according to claim 1, wherein the key is provided with a detent latch means for retaining the key in the keyway when the key is slid to the second key position.

4. A spin casting fishing reel according to claim 1, wherein the key, the keyway and the frame are sized such that, when the key is in the first key position, the key is fully enclosed within the reel frame flush with the frame exterior.

5. A spin casting fishing reel according to claim 1, wherein the key is provided with a pulling ledge and the keyway is sized to provide access for the operator'3 s finger to the pulling ledge to withdraw the key radially outwardly from the first to the second key position.

6. A spin casting fishing reel according to claim 1, wherein the spindle shaft sleeve is provided with an annular groove and the key is provided with a clevis for circumferentially engaging the annular groove in the spindle shaft sleeve when the key is in the first key position and for releasing the spindle shaft sleeve and the spindle shaft assembly when the key is moved to the second key position.

* * * * *

UNITED STATES PATENT AND TRADEMARK OFFICE
CERTIFICATE OF CORRECTION

PATENT NO. : 4,997,143
DATED : March 5, 1991
INVENTOR(S) : Steven L. Grice

It is certified that error appears in the above-identified patent and that said Letters Patent is hereby corrected as shown below:

Claim 2, line 5, delete "kay" and insert --key--;
Claim 5, line 3, delete "operator'3s" and insert --operator's--.

Signed and Sealed this

Nineteenth Day of May, 1992

Attest:

DOUGLAS B. COMER

*Attesting Officer*      Acting Commissioner of Patents and Trademarks